United States Patent [19]
Mann

[11] Patent Number: 6,032,572
[45] Date of Patent: Mar. 7, 2000

[54] CORN POPPING APPARATUS

[76] Inventor: Gary A Mann, P.O. Box 1596, Cody, Wyo. 82414

[21] Appl. No.: 09/205,543

[22] Filed: Dec. 3, 1998

Related U.S. Application Data

[62] Division of application No. 08/871,148, Jun. 9, 1997, Pat. No. 5,857,403.

[51] Int. Cl.⁷ .................................. A23L 1/00; A23L 1/18
[52] U.S. Cl. .......................................... 99/323.9; 99/323.5
[58] Field of Search .............................. 99/323.5, 323.6, 99/323.7, 323.8, 323.9, 323.11, 348; 126/343.5 A, 343.5 R, 25 R, 9 R; 366/185; 426/93, 113

[56] References Cited

U.S. PATENT DOCUMENTS 5,857,403  1/1999  Mann ...................................... 99/323.9

Primary Examiner—Timothy Simone
Attorney, Agent, or Firm—Dean P. Edmundson

[57] ABSTRACT

A corn popping apparatus comprising a box-like cabinet with a tiltable lid to which is attached a large metal popping kettle. When the lid is lowered the bottom of the kettle projects downwardly into the cabinet interior through a panel covering the top of the cabinet. In this lowered lid position, the kettle is heated to popping temperature by a fuel burner inside the cabinet. The opening in the panel through which the kettle projects is sealed by the bottom wall of the kettle to block undesirable venting of combustion products and heated air through the top of the cabinet. The lid and the subjacent cabinet top panel also coact to provide an air space therebetween which provides a thermal barrier. A popped corn holding vessel is detachably secured to a cabinet exterior wall to receive the kettle contents when the lid is tipped upwardly. A lid counterbalancing device is provided to reduce the time and effort required to raise the lid for kettle dumping. The cabinet includes wheels which can be pivoted between raised and ground-engaging positions.

7 Claims, 3 Drawing Sheets

CORN POPPING APPARATUS

CROSS-REFERENCE TO RELATED APPLICATION

This application is a division of my application Ser. No. 08/871,148, filed Jun. 9, 1997, now U.S. Pat. No. 5,857,403.

BACKGROUND OF THE INVENTION

This invention relates to an improved apparatus for preparing a popped corn snack food popularly call "kettle corn." Frontiersmen and early settlers prepared popped corn in iron kettles placed over open wood fires. Later, such crude equipment and methods were modified by popped corn vendors who mounted kettle-like popping receptacles upon wagons and carts for movement along city streets and sidewalks. Descriptions of the structural and operational features of early portable poppers are contained in these prior U.S. Patents:

| | | |
|---|---|---|
| 1,449,687 | Marfisi | March 27, 1923 |
| 1,457,854 | Parks | June 05, 1923 |
| 1,464,567 | French | August 14, 1923 |
| 1,594,190 | Barnard | July 27, 1926 |

Typically, these popper structures comprised a wheeled cabinet upon which were mounted a tiltable corn popping kettle, a popped corn storage receptacle proximate the kettle, and a fuel burner disposed below the kettle. Commonly, such burners were fueled with pressurized gasoline or kerosene vapor; however, later poppers having similar structural arrangements were provided with electric heater units such as that shown in U.S. Pat. No. 2,117,872 issued to Barnard on May 17, 1938.

In more recent times, the carts of street vendors of popped corn have been replaced by sophisticated, highly efficient popping machines commonly encountered in theater lobbies, snack bars and fast-food stores. Moreover, consumers can now purchase sealed packages of popped corn in a variety of flavors; and, corn kernels can be popped at home by means of microwave ovens or specialized hot air appliances. In spite of these dramatic changes in methods and means for popping corn, a vestige of "old time" corn popping has been preserved through the years by certain vendors who pop corn in large metal kettles over an open flame. Such vendors tout their kettle corn as having a special flavor and texture imparted to the popped corn by preparing it in accordance with "old time" methods in an outdoor setting where freshly popped corn is immediately sold and consumed. Today, kettle corn vendors can be found at outdoor events such as pioneer festivals, community commemorative events, fairs, markets, exhibitions of antiquated crafts, and a variety of outdoor sports events.

Vendors who reproduce the original kettle corn flavor and demonstrate faithfully pioneer kettle popping procedures use a kettle much larger than those disclosed in the aforecited U.S. Patents in order to retain exploding kernels within a kettle which typically has no lid or similar top closure. Moreover, it is desirable that the kettle top remains open so that the appetizing aroma and characteristic sound of popping corn can better escape the kettle to entice potential customers. A sizeable, open top kettle also enables a vendor to pop large batches of corn while continuously monitoring the popping process and agitating the mass of popping kernels with a rustic pole or paddle which carries out a back-country theme.

Due to the considerable size of a preferred popping kettle and the common use of iron and steel to fabricate such kettles, their bulk and weight make them inherently difficult to transport from place to place and to support vertically above a heat source. Besides the problems encountered in transporting and positioning heavy kettles, emptying a hot kettle of a mass of popped corn can be an arduous task. To forestall overcooking or burning of popped kernels, the preparer had to empty the kettle quickly by scooping the kernels over the edge of the kettle into another receptacle all the while avoiding personal contact with the heat source under the kettle and the hot surface of the kettle itself.

Heretofore the aforenoted multiple problems of transporting, supporting and emptying a weighty old-style popping kettle have been somewhat alleviated by situating the bowl-like kettle inside a box-like cabinet with the top of the kettle opening upwardly through the top of the cabinet. The kettle is attached to and suspended from the top of the cabinet with the kettle bottom hanging above a fuel burner mounted inside the cabinet. The cabinet top is manually pivotable about one edge in a manner which permits the preparer to dump the contents of the kettle into a suitable receptacle disposed outside the cabinet. Normally, a frame defining the bottom of the cabinet rested directly upon an underlying ground surface. The cabinet was movable from one popping site to another by lifting both the cabinet and the kettle contained therein and transporting them manually or by means of a hand truck, or the like, inserted under the bottom edge of the cabinet. Handling the aggregate weight and bulk of the cabinet and kettle by such a lifting and moving operation comprised a laborious task particularly over uneven or sloping surfaces.

Another problem entailed in popping large quantities of popcorn in a large kettle over an open flame involves management not only of the flame, but also of the substantial volume of combustion products and heated air created by burning a sufficient quantity of fuel to achieve and maintain the required popping temperature of about 400° F. for a prolonged period of time. Most of the abovecited prior U.S. patents depict open flame poppers supported on various cabinet structures from which flame and hot gases created inside the cabinets are vented upwardly through the open cabinet top about the upstanding sidewall of the popping kettle. Contemporary kettle corn poppers also involve such venting of flame and gas directly through the open top of the box-like cabinet which suspends the kettle over the flame. This upward flow of hot gases produces unwanted heating of the upper wall portion of the kettle as well as the cabinet structure surrounding and supporting the top of the kettle. Unless great care is taken, such flow of hot gas about the periphery of the kettle during popping may cause injury to the vendor as he attempts to stir the kernels in the kettle to assure even and complete popping. Should the popping kettle be situated inside a tent or similar structure or shaded by an awning, uncontrolled upward venting of hot gases could create a fire hazard.

Another significant shortcoming of previously known kettle poppers is the lack of an efficient means for handling a large mass of popped corn. After popping is completed, the popped corn is dumped from the hot kettle by tipping the top frame of the cabinet together with the kettle which is usually secured to this frame. Such manual tipping of the hot kettle can be difficult and dangerous; therefore, various auxiliary devices, including components such as gears and counterbalancing springs, have been incorporated in contemporary kettle poppers to assist the preparer in tipping the kettle. Such devices have proven to be cumbersome, complicated, and largely ineffective.

Since a popping kettle is capable of producing very large individual batches of popped corn and since multiple batches are often prepared in rapid succession to accommodate a rush of customers, a large receptacle able to hold several batches is usually placed proximate the popping kettle. Popped corn is then manually scooped from this holding receptacle and bagged as needed. Usually, the holding receptacle, which may comprise a second metal vessel is not structurally associated with the frame which supports the kettle but is, instead, placed directly on the ground or on another stand at one side of the kettle. Since the holding vessel is not coupled directly to the kettle frame, it is subject to accidental dumping or shifting out of alignment with a stream of popped corn as it empties from the kettle.

The foregoing recitation of the shortcomings of kettle-type corn popping components and methods suggests that several changes in popper construction and organization are needed to provide a comprehensive apparatus which exhibits the operational convenience and efficiency required by those whose business is preparing and vending kettle corn, namely:

The popping kettle and its supporting frame or cabinet should be readily movable from place to place yet be highly stable once moved.

The upward emission of flame and hot gases from the popper should be contained and directed so as to reduce or eliminate the chance of injury to vendors conducting the popping operation, to customers who approach the popper cabinet, and to combustible materials disposed proximate the popper cabinet.

After a batch of corn is popped, the kettle should be conveniently tiltable over an edge of the popper cabinet in a quick and easy manner to dump successively popped batches into a suitable vessel.

The vessel for receiving and holding popped corn dumped from the popping kettle should have a volume substantially greater than the kettle; and, the vessel should be detachably coupled to the frame of the cabinet at the correct height and angular alignment with respect to the kettle for receipt of the kettle contents.

SUMMARY OF THE INVENTION

A general object of this invention is to provide a corn popping apparatus for preparing kettle corn which overcomes the aforementioned shortcomings of prior art devices now employed for this purpose.

A primary object of this invention is to combine structurally a large popping kettle, a kettle-supporting cabinet and a popped corn receiving-holding vessel to achieve these important advantages:

Provision of substantial degree of mobility for such a relatively heavy structural combination;

Provision of an improved process and means for producing and vending large quantities of freshly prepared popcorn; and, Reduction to a minimum of the hazards and discomfort unavoidably attending the preparation of popped corn over an open flame.

With the above objects in view this invention is embodied in an improved cabinet structure having a hinged lid which carries the popping kettle. The cabinet comprises an assemblage of elongated metal members which are joined together to form an open, box-like framework. The vertical side frames are covered with metal panels, the top frame is partially closed by a centrally apertured panel. The lid is hinged at one edge to the top horizontal edge of one of the side frames. Between the panels covering the top frame and the lid frame, an air space or chamber is defined when the lid frame rests upon the underlying top frame. The axially aligned apertures opening through the top panel and the lid panel are circular and are sized to receive the circular kettle bottom so that the portion of the kettle which depends through the top panel and the lid into the cabinet interior is substantially greater than the remaining kettle portion which projects vertically above the lid panel. The lid panel and the kettle exterior wall are welded together about their circular line of contact; and, the aperture in the top panel through which the kettle passes is sized to fit closely about the kettle exterior. Pivotal movement of the lid about its hinged edge with respect to the top frame of the stationary cabinet withdraws the kettle bottom through the aperture in the top wall closure panel and causes the kettle to swing upwardly in an arc over and beyond the hinged edge of the cabinet causing a gravity-induced flow of the kettle's contents into a suitable receptacle or vessel.

In accordance with another objective of this invention, the horizontal bottom members of two opposed side frames of the cabinet extend horizontally outwardly well beyond the side frame to which the lid is hinged. These bottom members pivotably support therebetween a wheel-mounting frame which is selectively swingable between opposed angular positions. An axle secured between the sides of the wheel mounting frame carries wheels which are lowered for engagement with the ground in one extreme angular position of the mounting frame and are lifted off the ground when the frame is moved to its opposed extreme angular position. When the wheels are in the lifted condition, the extended side frame bottom members rest on the ground. A second pair of wheels carried by an axle attached between the aforesaid bottom members extend through the open bottom frame of the cabinet for rolling contact with the ground surface underlying the cabinet. It will be appreciated that all four wheels engage the ground in the lowered position of the wheel mounting frame to facilitate movement of the kettle-cabinet-holding vessel combination; and, that, in the raised position of the wheel-mounting frame, the extended side frame bottom members rest directly upon the ground surface and serve to stabilize the popper apparatus.

Another aspect of this invention is the provision of improved means for detachably mounting a popped corn receiving and holding vessel to that side of the cabinet over which the popping kettle is tipped for dumping. To this end, the vessel is suspended off the ground at a convenient height by a curved, circular bracket which underlies and engages the peripheral rim of the vessel. The bracket includes elongated tubular receivers into which are insertable a pair of elongated shafts projecting toward the vessel from the cabinet side frame proximate the vessel. The telescoping engagement of the tubular receivers about the elongated shafts maintains the plane of the circular bracket perpendicular to the proximate upright side of the cabinet and holds the vessel bottom in vertically spaced relation with the underlying wheel-mounting frame. The vessel and its supporting bracket are easily detached from the cabinet for cleaning or transporting simply by slidably withdrawing the bracket receivers from the shafts projecting from the cabinet.

A further object is to provide an improved cabinet for housing and venting a burner which heats that portion of the surface of the popping kettle which depends downwardly from the lid panel through the subjacent top panel and into the cabinet interior. To this end, the cabinet is open at its bottom to admit combustion air for the burner, the aperture through the cabinet top panel is substantially sealed by the interfitting kettle bottom, and combustion products and heated air are vented through selected side panels of the cabinet except for those brief intervals when the kettle is tipped upwardly for dumping. Not only do the cabinet top panel and the lid panel coact to block most of the undesirable upward venting of hot gas from the cabinet top, but the aforedescribed air space defined by and between these panels provides a useful degree of thermal insulation between the heated cabinet interior and area above and around the cabinet top where the preparer is required to work.

Yet another object is to provide a counterbalancing mechanism between the cabinet and the lid which enables the preparer to tilt the kettle for dumping its contents very quickly and with little physical effort.

A still further object is to provide an improved corn popping apparatus having the aforesaid characteristics which is practical and efficient in its use and operation, which is of simple yet rugged-construction, and which can be manufactured at low cost.

These and other objects and advantageous features of the invention will become apparent and the invention will be best understood and fully appreciated by having reference to the following detailed description of a preferred embodiment of the invention taken in conjunction with the accompanying drawings.

DESCRIPTION OF THE DRAWINGS

FIG. 3 is a section taken along lines 3—3 of FIG. 2;

FIG. 4 is a section taken along lines 4—4 of FIG. 2;

DETAILED DESCRIPTION OF THE INVENTION

Figure 1:
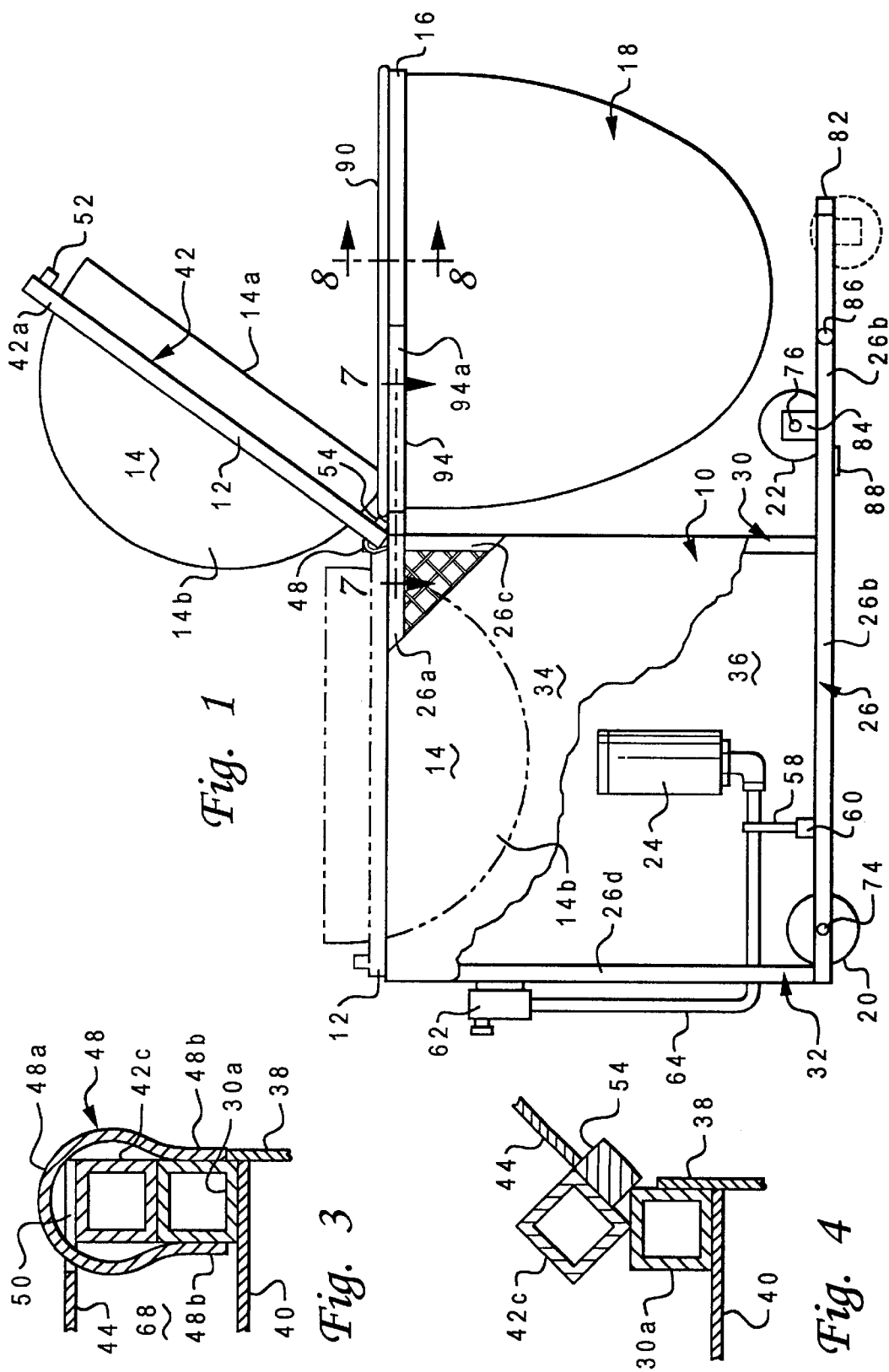
FIG. 1 is a side elevation of an improved corn popping apparatus with a portion of the cabinet side panel broken away.
Figure 2:
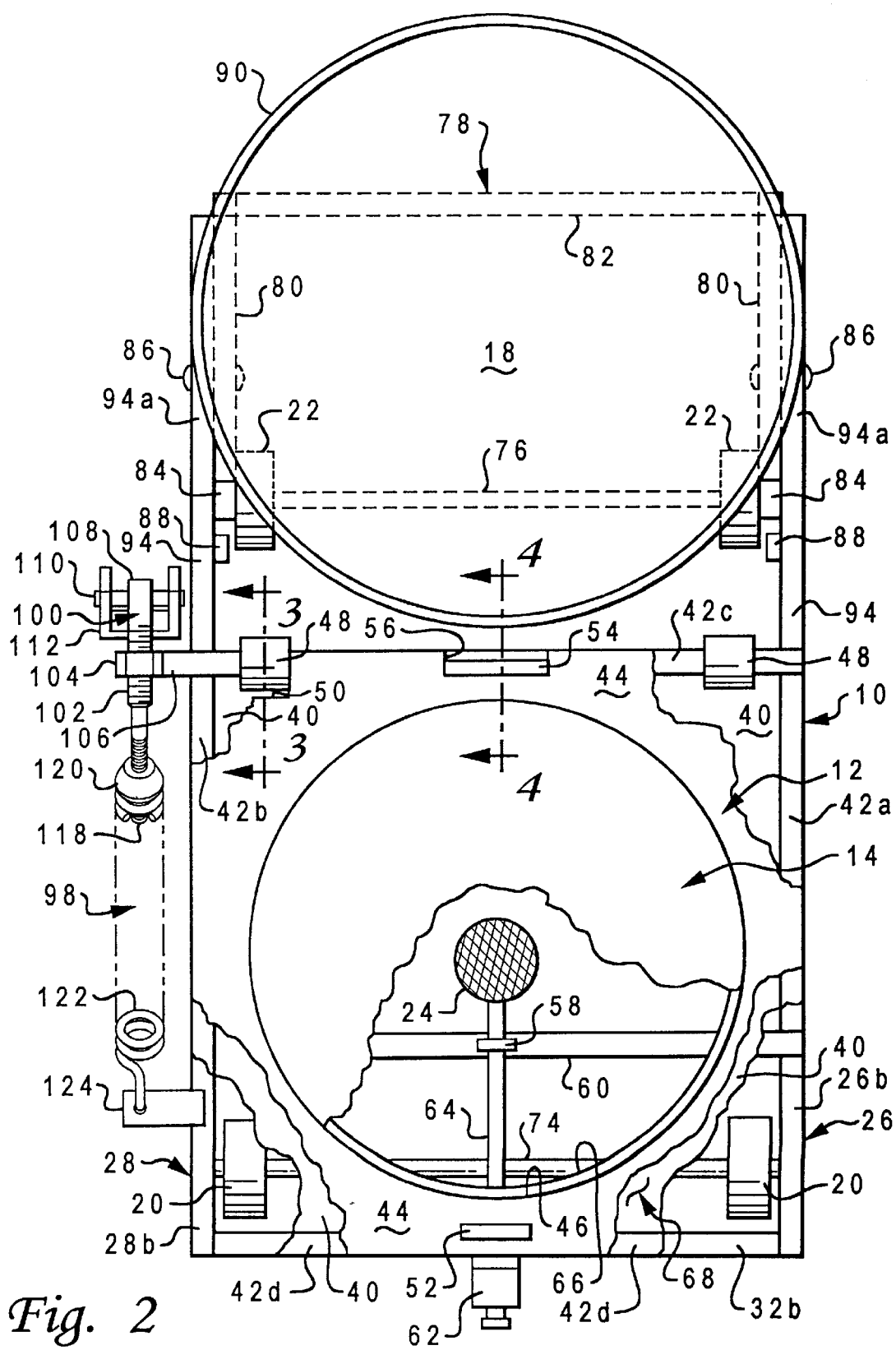
FIG. 2 is a top plan view with various panels broken away to show interior details of the apparatus.

Referring FIGS. 1 and 2 of the drawings, the illustrative popping apparatus includes a generally cubic cabinet 10 to a top edge of which is attached a tiltable lid 12 penetrated by the bottom portion of a sizeable corn popping kettle 14. A bracket 16 is mounted on the cabinet and supports a large holding vessel 18 proximate the front wall of the cabinet. Two sets of ground engaging wheels 20 and 22 are attached to the bottom of the cabinet 10 to facilitate movement of the apparatus from place to place. A fuel burner 24 is housed within the cabinet below the kettle 14 for heating corn kernels to popping temperature.

The cabinet 10 includes an open, box-like structure made up of upright, generally square metal frames 26 and 28 which provide the right hand side and left hand side, respective, of the cabinet as viewed in FIG. 2, and similar frames 30 and 32 which provide the front side and rear side, respectively, as viewed in FIG. 1. Preferably, the frames 26, 28, 30, 32 are fabricated by welding together tubular steel members having a square cross section. For example, and as best shown in FIG. 1, the top and bottom horizontal members 26a, 26b, respectively, of side frame 26 are welded to the front and rear vertical members 26c, 26d of this frame. The other cabinet frames referred to hereinafter are similar in structure; and, the method of assembling the basic cabinet framework will be obvious to those acquainted with metal fabrication.

Figure 5:
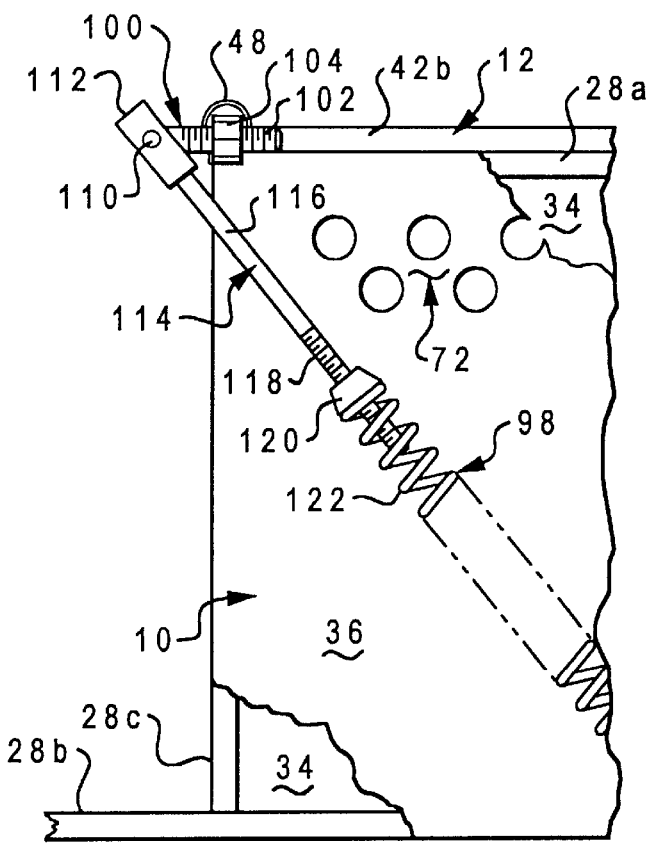
FIG. 5 is a partial side elevation.

Each of the upright frames 26, 28, 30, 32 is covered by a steel sheet or panel welded to the vertical and horizontal tubular members defining each frame. FIG. 1 shows the right hand panel 34, FIG. 5 depicts a major fragment of the left hand panel 36, and FIGS. 3 and 4 show small fragments of the front panel 38. The rear frame 32 is covered by a similar panel, not shown, to complete the vertical enclosure of the space inside cabinet 10. The bottom of the cabinet is open to admit combustion air to the fuel burner 24. The joined upper members of side frames 26, 28, 30, 32, of which members 26a 28a, and 30 a are shown in the drawings, define a top marginal frame for the cabinet 10. To the undersides of these marginal members is attached a top panel 40 similar to panels covering the sides of the cabinet.

The lid 12 includes a frame 42 corresponding in size and shape to the aforedescribed frame defining the top of the cabinet; and, frame 42 is made up of side members 42a, 42b and front and rear members 42c, 42d. Overlying and attached to the upper-surfaces of members 42a, 42b, 42c, 42d is a steel lid panel 44 having a central aperture 46 through which extends the bottom portion of kettle 14. The kettle 14 and lid panel are welded together or otherwise attached at their circular line of contact so that the kettle may be tilted with the lid 12 and dumped in a manner to be described. The lid 12 is pivotally hinged to the cabinet 10 for upward tilting movement about an axis extending longitudinally through the front top frame member 42c. FIG. 3 shows one of two like metal strap hinges 48 which surround pivot member 42c and are fixed to the underlying front frame-member 30a. The looped bodies 48a of the hinges are axially penetrated by member 42c; and, the spaced legs 48b of the hinges are welded to opposed surfaces of member 30a. The lid panel 44 is notched as shown at numeral 50 in FIGS. 2 and 3 to permit pivotal movement of the lid panel 44 relative to the fixed strap hinges 48.

In FIG. 1 the lid 12 and kettle 14 are depicted in their lowered or popping position relative to the cabinet 10; and, in FIG. 2, the lowered or popping position is shown in phantom lines while the tilted or dumping position is shown in full lines. To manipulate the lid and kettle about pivot member 42c to dump or to lower the same, the preparer may grasp a C-shaped handle 52 attached to the rearward portion of the top surface of lid panel 44. To limit the forward pivotal movement of the lid 12 to the desired stop position shown in FIG. 1, a metallic lug 54 is welded to the upper surface of lid frame member 42c and projects through a slot 56 relieved medially in the forward margin of lid panel 44. As best illustrated in FIG. 4, forward tilting of lid 12 and kettle 14 is arrested by abutment of the stop lug 54 against the front cabinet frame member 30a. In this arrested position, the lower portion of kettle rim 14a is disposed over and within the open top of the vessel 18 thereby assuring that the kettle contents will be directed into vessel without spillage.

As best seen in FIG. 1, a conventional propane gas burner 24 is mounted on a bracket 58 which extends upwardly from the center of an underlying crossmember 60 attached at its opposite ends to cabinet frame members 26b and 28b. A suitable burner control assembly 62 including a conventional gas supply valve and pilot light is mounted on the rear cabinet panel and is connected in line with the burner 24 and a propane tank, not shown.

An essential feature of this invention is the provision of a central aperture 66 in the top panel 40 of the cabinet 10 which has a diameter selected to permit the kettle's bottom portion 14b just to pass through panel 40 while depending downwardly into the cabinet interior in close proximity with the burner 24 when lid frame 42 is lowered to rest on the cabinet top frame. By mounting the kettle so that its bottom 14b projects through the lid panel 44 and by additionally providing the cabinet 10 with a top panel 40 having an aperture that can be effectively blocked by the kettle bottom, the emission of hot gases upwardly from the cabinet top during the popping operation is substantially reduced, if not altogether eliminated. Not only do the lid panel 44 and the top cabinet panel 40 coact to provide a double barrier to direct discharge of hot gas from the cabinet top, but an essentially closed, flat chamber 68 is defined between these panels when the kettle is lowered for popping. The vertical extent of chamber 68 is shown in FIG. 3; and, from FIG. 2 it will be understood that a wall segment of kettle 14 defines the inner wall of this chamber while the cabinet top frame and the lid frame abut one another to form an essentially square outer wall for chamber 68. An unexpected benefit derived from the provision of chamber 68 is that this air-filled space functions as a thermal insulating barrier which somewhat reduces unwanted convective heating of the lid 42, the handle 52, the kettle segment extending upwardly through the lid panel 44, as well as the open space immediately above the cabinet.

When the lid 12 is tipped to dump popped corn into vessel 18, the control 62 may be operated to reduce the heat output of the burner 24. In any event, when the central aperture 66 through the top panel 40 is open, the remainder of panel 40 partially abets the rush of hot gas from the open cabinet top. It is intended that the cabinet interior be vented at all times by means of suitable openings through one or more of the aforedescribed upright cabinet wall panels. For example, FIG. 1 shows that an upper corner of panel 34 has been removed and a protective screen put in place over the triangular opening; and, FIG. 5 depicts an array of circular openings 72 through wall panel 36.

Figure 6:
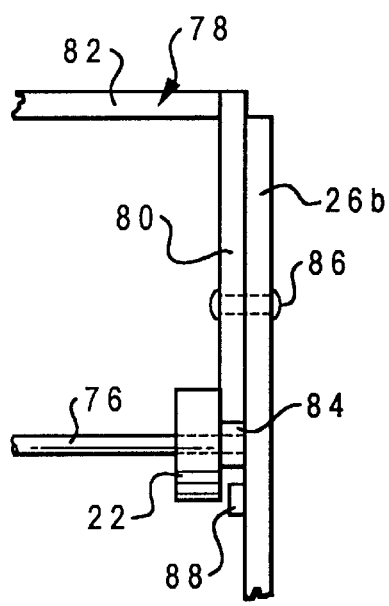
FIG. 6 is a fragmentary view of a wheel-mounting frame.

In accordance with one object of this invention, a substantial degree of mobility is afforded the relatively heavy and bulky corn popping apparatus by means of rear and front wheels 20, 22. The rear wheels 20 are conventionally mounted on a rear axle 74 attached between the cabinet side frame bottom members 26b, 28b whereby the wheels 20 project downwardly through and beyond the bottom of the cabinet 10, as shown in FIG. 1 The side frame bottom members 26b, 28b project forwardly considerably beyond the cabinet side frame upright members 26c, 28c, respectively, as shown in FIGS. 1 and 5. A front axle 76 which carries the front wheels 22 is mounted on an oscillating frame 78 comprising spaced legs 80 which are connected by a cross member 82 and by the axle 76. Attached proximate the ends of the legs opposite the cross-member 82 are apertured blocks 84 which receive and retain the opposite ends of the axle 76. As shown in FIGS. 2 and 6, the frame 78 is rotatably attached between the cabinet side frame bottom members 26b, 28b by pins 86 extending laterally through the legs 80. In the wheel-lifting position of the frame 78, shown in full lines in FIG. 1 and also shown in FIG. 6, the blocks 84 project upwardly from the frame legs 80 thereby raising the axle sufficiently to support the wheels 22 out of engagement with any underlying surface upon which the rear cabinet wheels 20 rest. With wheels 22 so raised, the front end of the members 26b, 28b will be tilted downwardly slightly by the cabinet's weight into stabilizing engagement with the surface underlying the cabinet. To lower the wheels 22 for ground engagement, members 26b, 28b are lifted so that frame 78 can be rotated or pivoted counterclockwise, as viewed in FIG. 1, through 180 degrees to place the wheels in the lowered condition depicted by phantom lines. In this position of the frame 78, the ends of the legs 80 opposite the wheels 22 will bear against a pair of stop tabs 88 which limit counterclockwise frame rotation. The tabs are located and fixed to the underside of members 26b, 28b so that they do not interfere with subsequent reverse rotation of legs 80. To raise the wheels 22, the members 26b, 28b are lifted to permit clockwise rotation of frame 78 and the wheels to the position shown in full lines in FIGS. 1 and 5 wherein the members 26b, 28b will again rest on an underlying surface.

Figure 8:
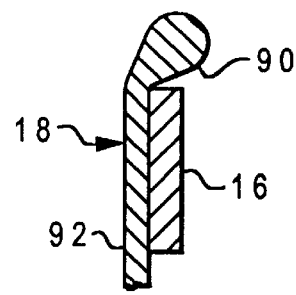
FIG. 8 is a partial sectional view taken along lines 8—8 of FIG. 1.

In accordance with this invention, the large, pot-like vessel 18 has a volumetric capacity great enough for holding several batches of popped corn dumped thereinto from the popping kettle 14. The vessel is preferably fabricated from a malleable metal such as copper and its size gives it substantial weight The vessel 18 is mounted directly upon cabinet 10 to provide the advantages of easy transportation of the vessel with the wheeled cabinet, stable support of the curved-bottom vessel off the ground, and vertical support for the vessel at an elevated height whereby manual scooping of popped corn from the vessel for bagging becomes more convenient and less tiresome. To this end, vessel 18 is suspended by a circular collar or bracket 16 which underlies and engages the vessel rim 90. FIG. 8 shows that the rim 90 is somewhat enlarged and has been shaped to project radially outwardly from the vessel wall 92. The bracket 16 is rectangular in cross section and is thin enough to permit the bracket to underly the rim 90 and to flex somewhat to conform to any irregularities in the vessel wall. As shown in FIG. 2 angularly opposed portions of the bracket 16 are connected to tubular receivers 94. The forward projection ends 94a of the elongated hollow receivers 94 are appropriately shaped to conform to the vertical wall of the bracket thereby facilitating attachment of the receivers to the bracket by welding or a similar process.

Figure 7:
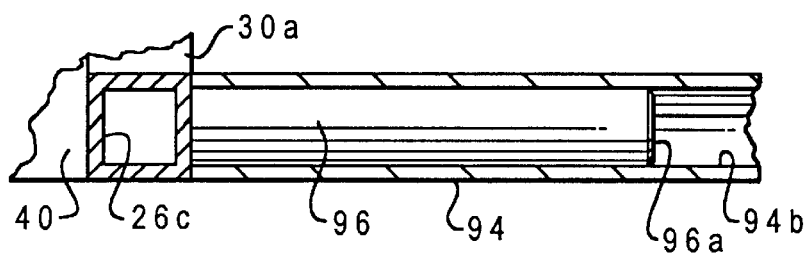
FIG. 7 is a section taken generally along lines 7—7 of FIG. 1.

As best illustrated in FIG. 7 an elongated cylindrical shaft 96 is rigidly fixed to the upright right side frame member 26c. An identical shaft, not shown, is similarly attached to the upright left side frame member 28c. The shafts 96 project in a cantilevered fashion forwardly from the members 26c and 28c and closely fit with the interior cylindrical wall 94b of the receivers 94. When shafts 96 are fully inserted into the receivers, the extreme rear end surfaces of the receivers abut the members 26c and 28c and the distal ends 96a of the shafts are situated proximate the points of attachment of the receiver ends 94a to the bracket 16. Such substantial telescopic engagement of the shafts 96 and receivers 94 rigidly supports the bracket 16 in vertically spaced relation with the underlying wheel-mounting frame 78. While ruggedly constructed receivers 94 and shafts 96 coact to support the substantial weight of the vessel 18, it will be understood that the bracket 16 can be readily removed from the cabinet 10, with or without the vessel in place, by sliding the receivers horizontally forwardly from the shafts. The ease of assembly and disassembly of the bracket 16 from the cabinet 10 facilitates removal of the vessel as desired for cleaning, transporting and storing the same.

To enable an operator of the hereindisclosed corn popping apparatus to tilt the kettle 14 for rapidly emptying its contents into vessel 18 thereby reducing the time that hot gas or flame may escape through the top panel opening 46 and, accordingly, reducing the exposure of the operator and customers near the apparatus to injury or discomfort, a counterbalancing device, indicated in its entirety by numeral 98, is attached between the cabinet side frame member 28b and the lid member 42c which, as noted above, pivots within the hinges 48 as the lid is raised and lowered. The device 98 includes a short rod 100 having a threaded end 102 extending through the opening of a nut 104 that is rigidly fixed to the laterally projecting extension 106 of the lid member 42c. The opposite end 108 of rod 100 is transversely penetrated by a pin 110 which, in turn, penetrates the spaced arms of a clevis 112. A rod 114 rigidly attached to the clevis at its upper end 116 has its lower end 118 threaded through a nut 120 fixed to the upper end coil of an elongated tension spring 122. The opposed end coil of this spring is anchored to a tab 124 extending outwardly from the left side frame bottom member 28b. The purpose of the spring 122 is to exert tension through the rod 114 and clevis 112 upon the forward end 108 of the rod 100. This tensile force acting on rod 100 creates a moment about the longitudinal axis of the lid pivot member 42c which counterbalances a substantial part of countervailing clockwise moment created by the combined weight of the lid 12 and the kettle 14. This counterbalancing effect can be adjusted to minimize operator effort required to tilt the lid for dumping while still permitting the lid to reseat completely upon the cabinet top frame when it is lowered. Such adjustment is achieved by changing the length of the forwardly projecting end 108 of the rod 100 and/or by changing the extent to which the 114 is threaded through the nut 120 whereby the spring tension is varied accordingly.

The foregoing description of the embodiment of the invention shown in the drawings is illustrative and explanatory only; and, various changes in the size, shape and materials, as well as in specific details of the illustrated construction, may be made without departing from the scope of the invention. Therefore, I do not intend to be limited to the structure shown and described herein, but intend to cover all changes, modifications and substructures which are encompassed by the scope and spirit of the appended claims.

What is claimed is:

1. A corn popping apparatus including a box-like enclosure having upright front, back and sidewalls, a closure lid for the open top of said enclosure tiltable about the top edge of said front wall, a corn popping kettle tiltable with said lid over and beyond said top edge to dump popped corn therefrom, wherein the improvement comprises:

receptacle mounting means detachably securing a receptacle proximate said front wall in alignment with said kettle to receive popped corn dumped from said kettle.

2. The combination set forth in claim 1, together with:

a stop member for limiting tilting of said closure lid and said kettle about the top of said front wall.

3. The combination set forth in claim 1, together with:

a spring having one end attached to said enclosure and the other end connected to said lid and exerting tension on said lid to tilt said lid upwardly about said front wall.

4. The combination set forth in claim 3, together with:

linkage means between said other end of said spring and said lid for adjusting said tension.

5. The combination set forth in claim 4, wherein:

said linkage means includes a first member threadably connected to said lid and second member having one end pivotably connected to said first member and its other end threadably connected to said spring.

6. The combination set forth in claim 1, wherein:

said receptacle comprises a vessel having a peripheral rim about the top thereof:

said mounting means includes a bracket which receives said vessel therethrough and underlies said rim to support said vessel vertically.

7. The combination set forth in claim 6, wherein:

said bracket comprises a circular collar having a pair of hollow tubular receivers attached thereto;

said front wall has a pair of elongated shafts projecting frontally therefrom; and, said shafts are removably insertable into said receivers.

\* \* \* \* \*

Disclaimer 6,032,572 — Gary A. Mann, Cody, WY. CORN POPPING APPARATUS. Patent dated Mar. 7, 2000. Disclaimer filed Mar. 31, 2004, by the assignee, Gary A. Mann.

Hereby enters this disclaimer to the remaining term of said patent.

*(Official Gazette, August 10, 2004)*